(12) United States Patent
Antunes et al.

(10) Patent No.: US 11,242,130 B2
(45) Date of Patent: *Feb. 8, 2022

(54) SHUTTERING MECHANISM FOR WING SLAT TELESCOPIC TUBE DUCT

(71) Applicant: EMBRAER S.A., São José dos Campos-SP (BR)

(72) Inventors: Marco Antonio Antunes, São José dos Campos-SP (BR); Erik Keiti Mino, São José dos Campos-SP (BR)

(73) Assignee: YABORÃ INDÚSTRIA AERONÁUTICA S.A., São José Dos Campos-Sp (BR)

( * ) Notice: Subject to any disclaimer, the term of this patent is extended or adjusted under 35 U.S.C. 154(b) by 106 days.

This patent is subject to a terminal disclaimer.

(21) Appl. No.: 16/816,464

(22) Filed: Mar. 12, 2020

(65) Prior Publication Data

US 2020/0307770 A1    Oct. 1, 2020

Related U.S. Application Data

(60) Provisional application No. 62/823,826, filed on Mar. 26, 2019.

(51) Int. Cl.
| | | |
|---|---|---|
| *B64C 9/22* | (2006.01) | |
| *B64C 3/38* | (2006.01) | |
| *B64C 9/02* | (2006.01) | |

(52) U.S. Cl.
CPC .............. *B64C 9/22* (2013.01); *B64C 3/38* (2013.01); *B64C 9/02* (2013.01)

(58) Field of Classification Search
CPC .... B64C 9/02; B64C 7/00; B64C 3/20; B64C 3/38; B64C 9/24; B64C 3/26; B64C 9/18; B64C 9/22; B64D 15/04; B64D 2033/0233; B64D 33/02; B64D 13/06; B64D 13/02

See application file for complete search history.

(56) References Cited

U.S. PATENT DOCUMENTS

| | | | | |
|---|---|---|---|---|
| 1,818,000 | A | * | 8/1931 | Moles ................. B64C 9/24 244/203 |
| 3,486,720 | A | * | 12/1969 | Seglem ............... B64C 9/24 244/210 |
| 4,585,192 | A | * | 4/1986 | Clifford-Jones ..... B64C 3/50 244/214 |

(Continued)

*Primary Examiner* — Assres H Woldemaryam
(74) *Attorney, Agent, or Firm* — Nixon & Vanderhye P.C.

(57) ABSTRACT

An aircraft wing is provided having a wing leading edge, a wing leading edge slat positioned forwardly of the wing leading edge having an internal duct extending in a spanwise direction of the wing leading edge, a cut-out opening in the wing leading edge, a telescopic tube extending through the cut-out opening and connected to the internal duct of the wing leading edge to establish fluid communication with heated air associated with an aircraft anti-icing system, wherein the telescopic tube is moveable between retracted and extended conditions in response to the wing leading edge slat being moved between slat retraction and deployment positions, respectively, and a shuttering mechanism synchronously connected to the telescopic tube to close the cut-out opening in response to the telescopic tube being moved from the retracted condition to the extended condition thereof.

11 Claims, 5 Drawing Sheets

(56) References Cited

U.S. PATENT DOCUMENTS

| | | | | |
|---|---|---|---|---|
| 4,615,499 A * | 10/1986 | Knowler | ............... | B64D 15/04 244/134 B |
| 6,015,117 A * | 1/2000 | Broadbent | ............... | B64C 9/22 244/214 |
| 7,322,547 B2 * | 1/2008 | Konings | ............... | B64C 9/26 244/214 |
| 8,708,280 B2 * | 4/2014 | Blanchard | ............ | H02G 11/006 244/131 |
| 10,919,616 B2 * | 2/2021 | Vervliet | ............... | B64C 9/22 |
| 2001/0038058 A1 * | 11/2001 | Gleine | ............... | B64C 3/46 244/198 |
| 2002/0109048 A1 * | 8/2002 | Bliesner | ............... | B64C 9/22 244/214 |

\* cited by examiner

SHUTTERING MECHANISM FOR WING SLAT TELESCOPIC TUBE DUCT

CROSS-REFERENCE TO RELATED APPLICATION

This application is based on and claims domestic priority benefits of U.S. Provisional Application Ser. No. 62/823,826 filed on Mar. 26, 2019, and may be deemed relevant to U.S. patent application Ser. No. 16/816,589 filed concurrently herewith on Mar. 12, 2020 entitled "Articulated Cover Assembly for Wing Leading Edge Slat Telescopic Tube Duct", the entire contents of each of which are expressly incorporated hereinto by reference.

FIELD

The embodiments disclosed herein relate generally to an aircraft wing provided with a leading edge wing slat. More specifically, the embodiments disclosed herein relate to a shutter door mechanisms that is operatively associated with a slat telescopic duct that serves to close the leading edge cutout opening in which the telescopic duct is operatively positioned.

BACKGROUND

Wing leading edge slats are conventionally connected to a telescopic tube duct that provides a path for heated air (e.g., typically engine bleed air) as part of the leading edge slat anti-icing system. A cut-out opening is provided in the leading edge skin of the wing to accommodate the positioning of the telescopic duct and allow it to be moved between retracted and extended conditions concurrently with the retraction and deployment of the wing leading edge slat, respectively.

However, when the leading edge wing slat is deployed, it will expose the cut-out opening to the oncoming incident airflow thereby potentially impacting aerodynamic performance of the slat and/or wing. It would therefore be highly desirable if the cut-out opening could be covered by a shuttering mechanism when the leading wing edge slat is deployed so as to minimize (if not alleviate entirely) adverse aerodynamic performance impacts. It is towards providing such solutions that the embodiments disclosed herein are directed.

SUMMARY

Generally, the embodiments disclosed herein are directed toward a shuttering mechanism whereby the cut-out opening in the wing leading edge skin associated with the telescopic tube duct for a leading edge slat is covered when the leading edge slat is deployed. According to some embodiments disclosed herein, an aircraft wing is provided which comprises a wing leading edge, a cut-out opening in the wing leading edge, a telescopic tube extending through the cut-out opening and connected to an internal duct of a wing leading edge slat positioned forwardly of the wing leading edge to establish fluid communication with heated air associated with an aircraft anti-icing system, wherein the telescopic tube is moveable between retracted and extended conditions in response to the wing leading edge slat being moved between slat retraction and deployment positions, respectively, and a shuttering mechanism synchronously connected to the telescopic tube to close the cut-out opening in response to the telescopic tube being moved from the retracted condition to the extended condition thereof.

The shuttering mechanism may comprise a shutter door that is mounted for rotational movement in response to the telescopic tube being moved between the retracted and extended conditions thereof. According to certain embodiments, the shuttering mechanism may comprise a guide lever attached to the telescopic tube and a guide roller attached to the shutter door and operatively associated with the guide lever. The guide lever may include a convexly curved guide slot, and wherein the guide roller is operably positioned within the guide slot. A spring element (e.g., a tension spring) may be provided to exert a bias force to maintain contact between the guide roller and the guide slot. According to some embodiments an opposed pair of self-alignment bearings are provided to allow the shutter door to rotate about an axis of the bearings.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 4:
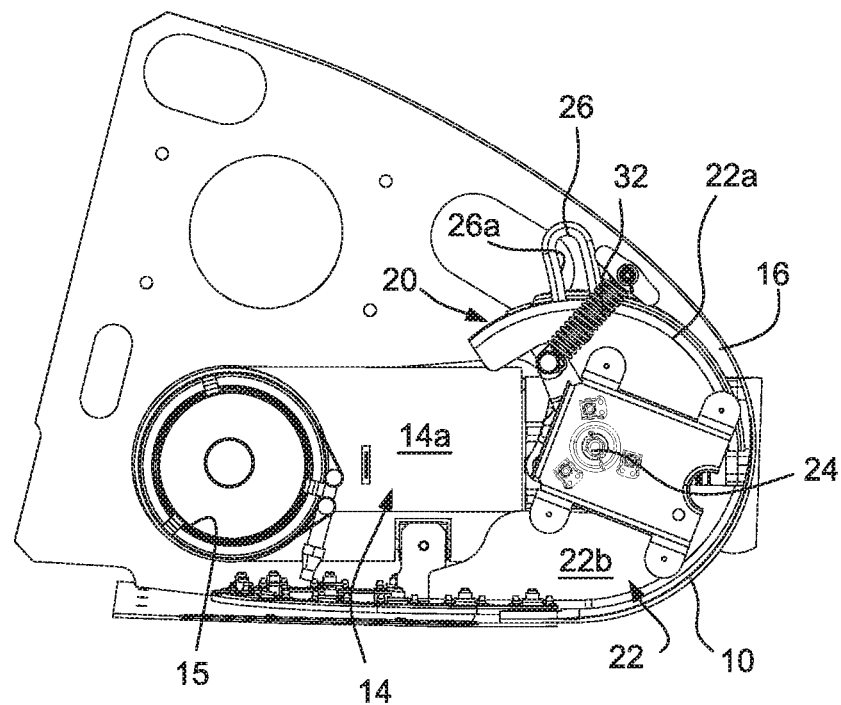
Figure 5:
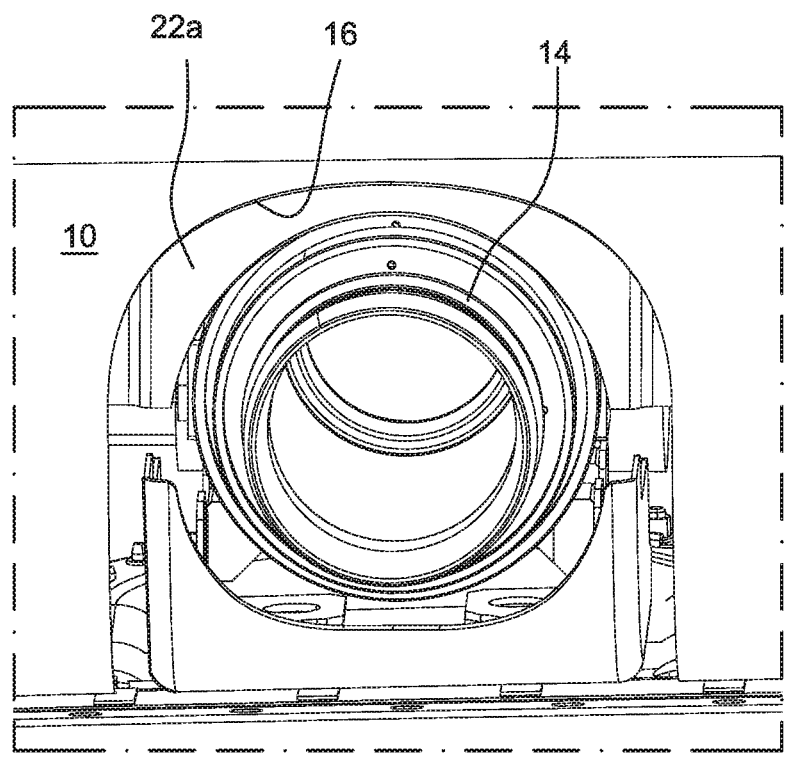
Figure 6:
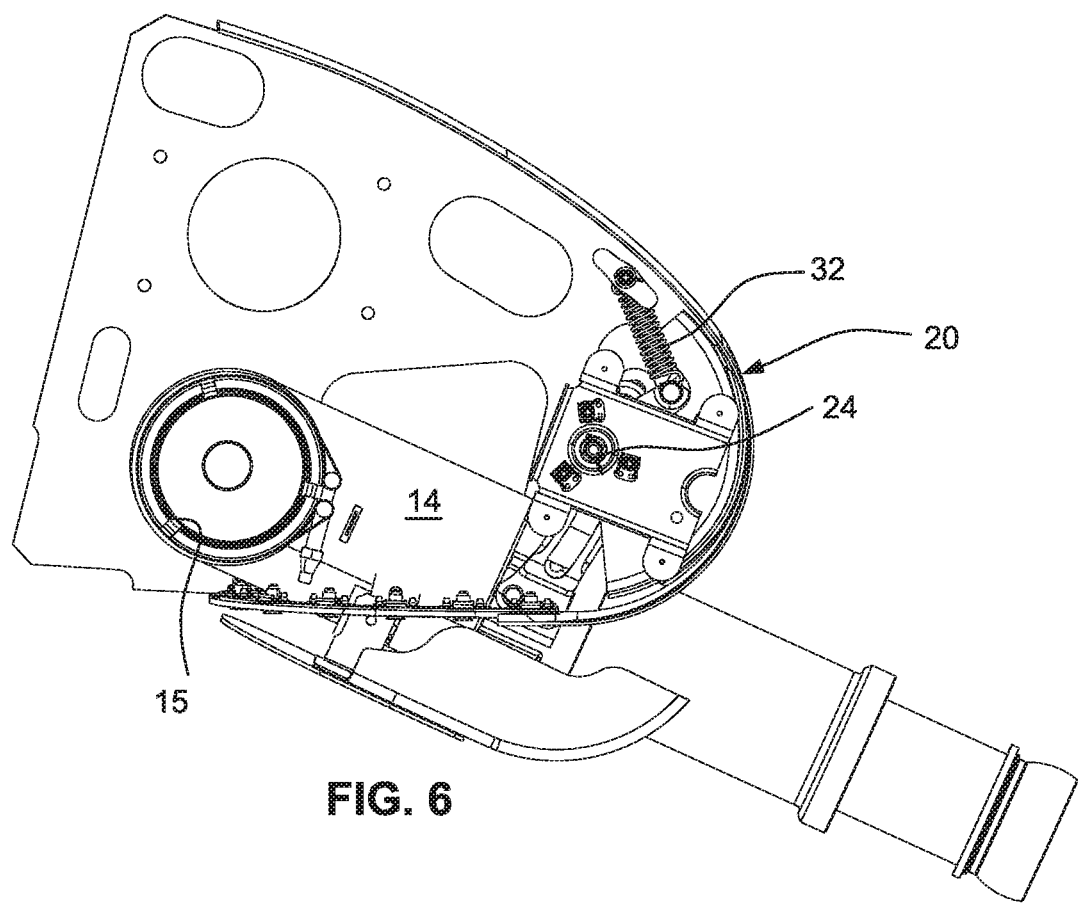
Figure 7:
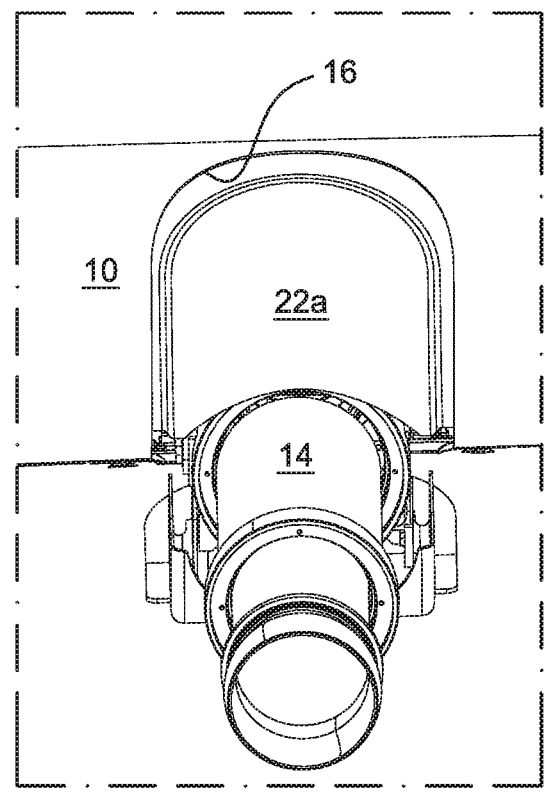

FIGS. 4 and 5 are respectively a cross-sectional elevational view and a front perspective view of the wing leading edge and associated shuttering mechanism for the cut-out opening depicted with the telescopic duct in a retracted condition; and FIGS. 6 and 7 are respectively a cross-sectional elevational view and a front perspective view of the wing leading edge and associated shuttering mechanism for the cut-out opening similar to FIGS. 4 and 5 but depicted with the telescopic duct in an extended condition.

DETAILED DESCRIPTION OF EMBODIMENTS

Figure 1:
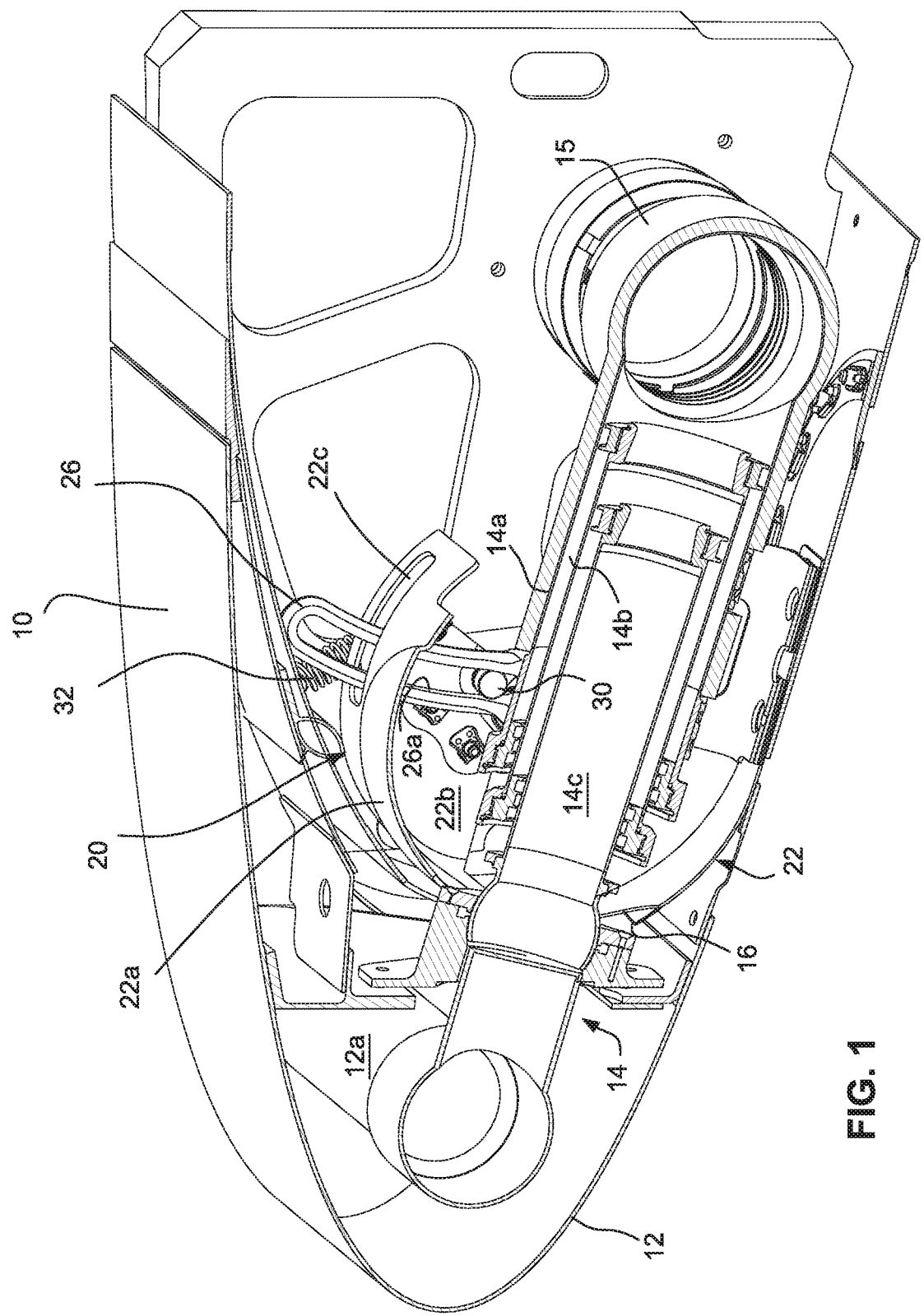
FIG. 1 is a left side perspective view, partly sectioned, of an aircraft wing leading edge and associated leading edge slat depicting an embodiment of the shuttering mechanism associated with the leading edge slat telescopic tube duct as described herein.
Figure 2:
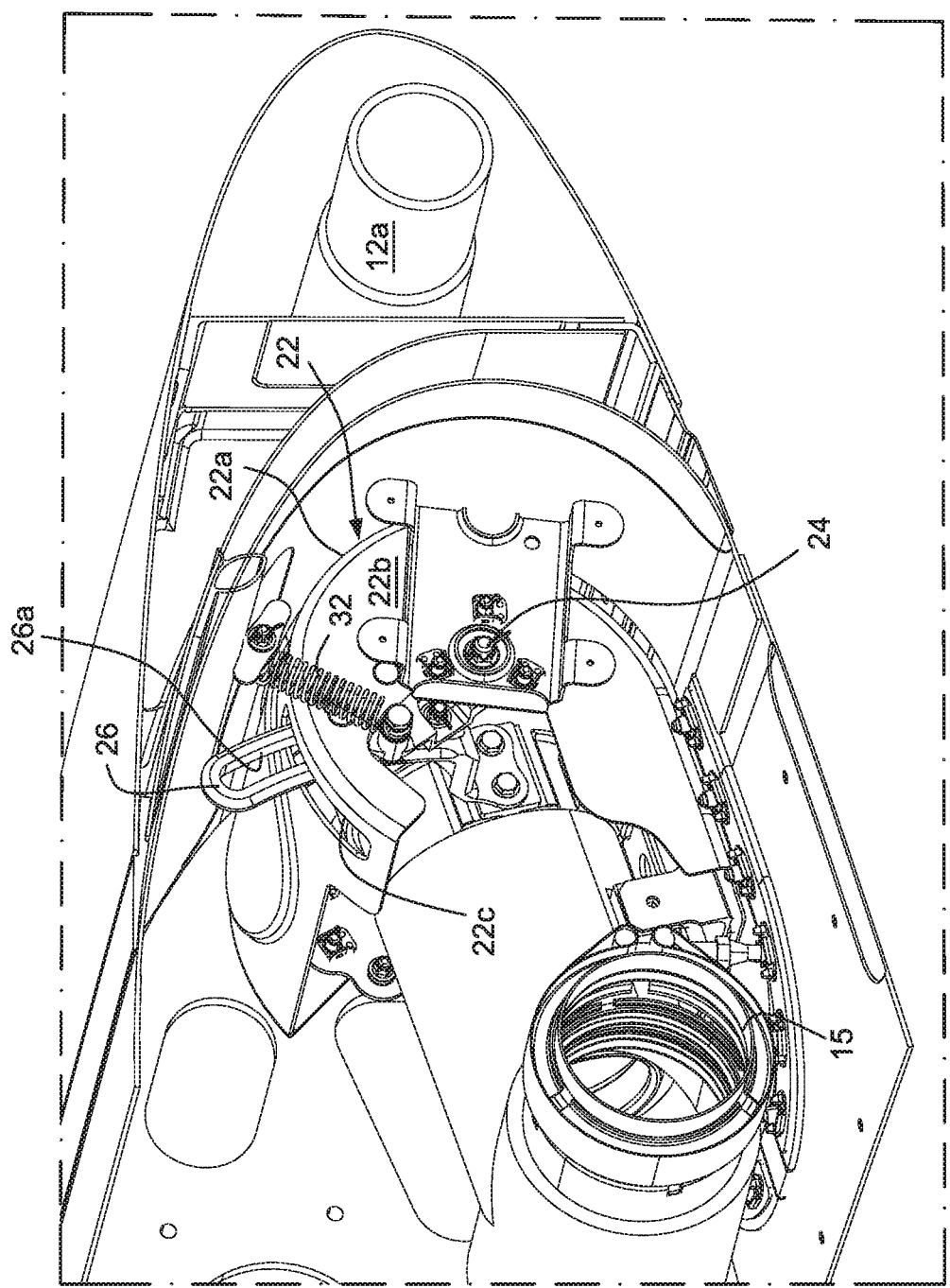
FIG. 2 is a right side perspective view of the aircraft wing leading edge and associated leading edge slat as shown in FIG. 1.
Figure 3:
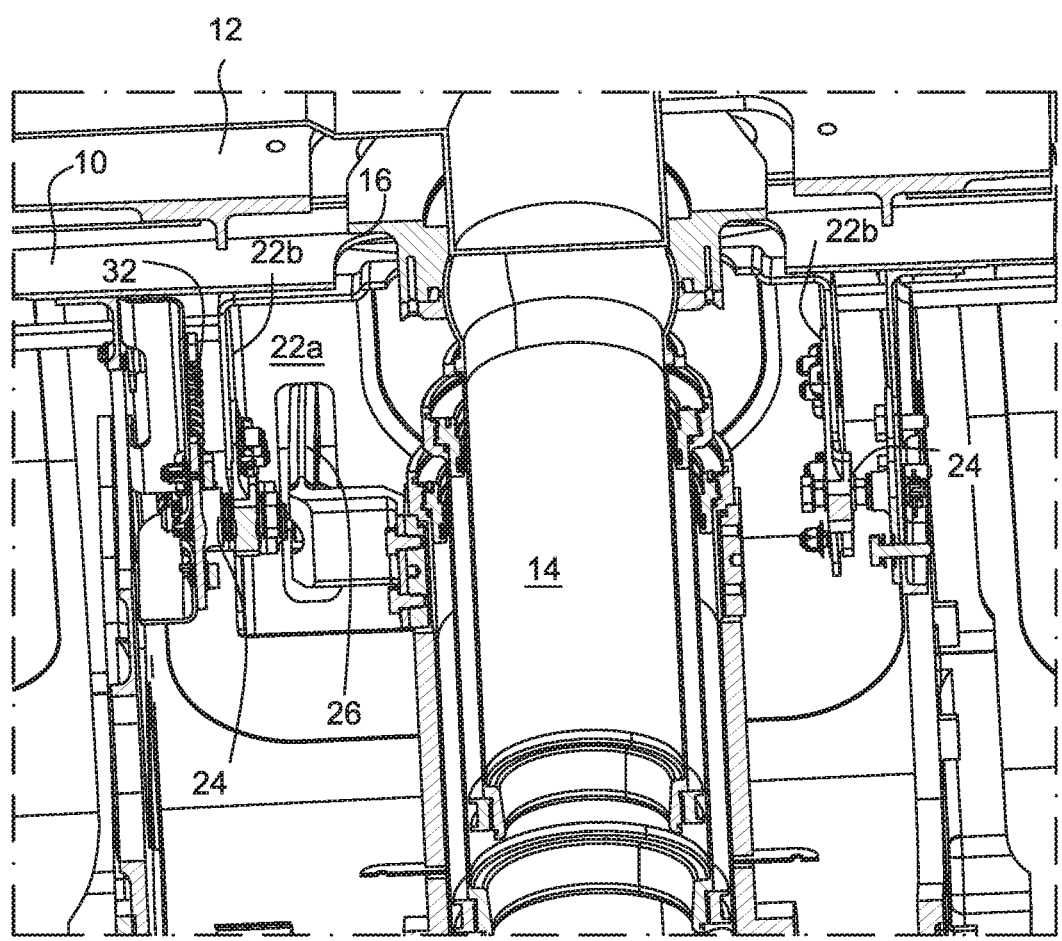
FIG. 3 is a top perspective view of the aircraft wing leading edge and associated leading edge slat as shown in FIG. 1.

Accompanying FIGS. 1-3 depict an aircraft wing leading edge 10 and associated leading edge slat 12 that are conventionally employed in transport category aircraft. The leading edge slat 12 is provided with an internal duct 12a extending in the span-wise direction of the slat 12 to receive heated air (e.g., engine bleed air) from a telescopic duct 14 associated with the aircraft's anti-icing system and positioned within a cut-out opening 16 in the wing leading edge skin. As is conventional, the telescopic duct 14 includes a spanwise support duct 15 which serves to supply heated air from a source (e.g., engine bleed air) to the telescopic duct 14. Also conventional, the telescopic duct 14 includes a proximal base duct section 14a which is non-extensible but rotatable about the axis of the support duct 15 and a series of telescopically nested duct sections 14b and 14c, the latter being fluid connected to the leading edge duct 12a.

In order to cover the cut-out opening 16 when the leading edge slat 12 is deployed thereby necessitating moving the telescopic duct 14 into an extended condition, a shuttering mechanism 20 in accordance with an embodiment of the present invention is provided so as to be synchronously operable with such movement of the telescopic duct 14. The telescopic tube duct 14 will telescopically extend outwardly and downwardly (i.e., will rotate downwardly about the axis of the supply tube 15) in response to outward and downward deployment of the wing leading edge slat 12. Since the wing leading edge slat 12 deploys downwardly and outwardly, the cut-out opening 16 in the wing leading edge skin will be exposed to a maximum extent (e.g., compare the retracted position of the telescopic tube duct 14 shown in FIGS. 4 and 5 with the extended position thereof as shown in FIGS. 6 and 7). In order to minimize the aerodynamic impacts of the cut-out opening exposure, the shuttering mechanism 20 is provided with the shutter door 22 that is synchronously connected to the proximal tube section 14a.

More specifically, as is perhaps best shown in FIGS. 1-3, the shutter door 22 includes a convexly arcuately shaped cover portion 22a and side support plates 22b. Each of the side support plates 22b is connected to a respective one of the opposed self-alignment bearings 24 so as to be capable of rotational movements about the bearing axes. The self-alignment bearings 24 serve to absorb movement deviations of the shutter door 22 as it pivotally moves synchronously with the telescopic tube 14.

In order to synchronize movement of the shutter door 22 with the telescopic tube 14, a guide lever 26 is provided which defines a convexly curved guide slot 26a. The lower end of the guide lever 26 is connected to the proximal section 14a of the telescopic tube 14, while a guide roller 30 associated with one of the side support plates 22b of the shutter cover 22 is positioned within the guide slot 26a. When the telescopic tube 14 is in a retracted position, the upper end of the guide lever 26 will extend through an access slot 22c associated with the shutter door 22a.

A tension spring 32 extends between the side plate 22b of the shutter cover 22 and surrounding fixed structure associated with the wing leading edge 10 provides a bias spring force that is inverse to the force generated by movement of the guide lever 26. The bias spring force exerted by the spring 32 thereby keeps the guide roller 30 in pressure contact with the arcuate surface of the guide slot 26a to avoid looseness during movement.

Upon deployment of the leading edge slat 12 in an outward and downward direction relative to the wing leading edge 10, therefore, the telescopic tube 14 will similarly be caused to move outwardly and downwardly. Due to the linked following relationship established between the roller 30 and convexly curved guide slot 26a of the guide lever 26, the shutter door 22 will synchronously rotate about the bearings 24 so that the cover portion 22a will progressively cover the cut-out opening 16 during extension of the telescopic tube 14.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. An aircraft wing comprising:
   a wing leading edge;
   a cut-out opening in the wing leading edge;
   a telescopic tube extending through the cut-out opening and connectable to an internal duct of a wing leading edge slat positioned forwardly of the wing leading edge to thereby establish fluid communication with heated air associated with an aircraft anti-icing system, wherein the telescopic tube is moveable between retracted and extended conditions in response to the wing leading edge slat being moved between slat retraction and deployment positions, respectively; and
   a shuttering mechanism synchronously connected to the telescopic tube to close the cut-out opening in response to the telescopic tube being moved from the retracted condition to the extended condition thereof.

2. The aircraft wing according to claim 1, wherein the shuttering mechanism comprises a shutter door that is mounted for rotational movement in response to the telescopic tube being moved between the retracted and extended conditions thereof.

3. The aircraft wing according to claim 2, wherein the shuttering mechanism comprises a guide lever attached to the telescopic tube and a guide roller attached to the shutter door and operatively associated with the guide lever.

4. The aircraft wing according to claim 3, wherein the guide lever includes a convexly curved guide slot, and wherein the guide roller is operably positioned within the guide slot.

5. The aircraft wing according to claim 4, wherein the shuttering mechanism further comprises spring element to exert a bias force to maintain contact between the guide roller and the guide slot.

6. The aircraft wing according to claim 2, wherein the shuttering mechanism comprises an opposed pair of self-alignment bearings to allow the shutter door to rotate about an axis of the bearings.

7. The aircraft wing according to claim 2, wherein the shutter door comprises a forward convexly curved shutter door portion adapted to cover the cut-out opening when the telescopic duct is in the extended position thereof, and a pair of opposed side plates connected to the forward convexly curved shutter door portion.

8. The aircraft wing according to claim 7, wherein the shuttering mechanism comprises a guide lever attached to the telescopic tube and a guide roller attached to one of the side plates and operatively associated with the guide lever.

9. The aircraft wing according to claim 8, wherein the guide lever includes a convexly curved guide slot, and wherein the guide roller is operably positioned within the guide slot.

10. The aircraft wing according to claim 9, wherein the shuttering mechanism further comprises a spring element to exert a bias force to maintain contact between the guide roller and the guide slot.

11. An aircraft which comprises the aircraft wing according to claim 1.

* * * * *